(12) United States Patent
Novak et al.

(10) Patent No.: US 8,404,792 B2
(45) Date of Patent: Mar. 26, 2013

(54) CYCLOBUTENE POLYMERS AND METHODS OF MAKING THE SAME

(75) Inventors: Bruce M. Novak, Raleigh, NC (US); Keitaro Seto, Kanagawa (JP)

(73) Assignee: North Carolina Sate University, Raleigh, NC (US)

( * ) Notice: Subject to any disclaimer, the term of this patent is extended or adjusted under 35 U.S.C. 154(b) by 0 days.

(21) Appl. No.: 13/221,302

(22) Filed: Aug. 30, 2011

(65) Prior Publication Data

US 2011/0313120 A1 Dec. 22, 2011

Related U.S. Application Data

(62) Division of application No. 12/438,075, filed as application No. PCT/US2007/018036 on Aug. 16, 2007, now Pat. No. 8,030,424.

(60) Provisional application No. 60/839,522, filed on Aug. 23, 2006.

(51) Int. Cl.
*C08F 10/00* (2006.01)
*C08F 10/04* (2006.01)
(52) U.S. Cl. ................ 526/280; 526/281; 526/348.6
(58) Field of Classification Search .............. 526/280, 526/281, 348.6
See application file for complete search history.

(56) References Cited

U.S. PATENT DOCUMENTS 3,366,616 A * 1/1968 Raymond ............... 526/280

FOREIGN PATENT DOCUMENTS

| IT | 718796 | 11/1966 |
|---|---|---|
| IT | 718796 | * 11/1996 |
| JP | 51-151275 A | 12/1976 |
| JP | 52-51500 A | 4/1977 |
| JP | 62-244056 A | 10/1987 |
| JP | 4-233966 A | 8/1992 |
| WO | WO 2006/023511 A1 | 3/2006 |

OTHER PUBLICATIONS

Garrou et al., IEEE Transactions on Advanced Packaging, 2000, 23, 568-573.*
Seto, K. "Metal Catalyzed Polymerization of Cyclic Olefins," Ph.D. dissertation, open defense, Jul. 26, 2006.*
International Search Report and Written Opinion, PCT/US07/18036, mailed Feb. 14, 2008.
Seto K. Metal catalyzed polymerization of cyclic olefins. Thesis. Jul. 26, 2006; complete pages.
Angiolini S et al. 47.1: High performance plastic substrates for active matrix flexible FPD. Proceedings SID 2003. May 2003, Baltimore, MD. 34: 1325-1327.
Barnes Da et al. Advanced materials for electronic applications by polymerization of cyclic olefins using late transition metal catalysts. Worldwide Metallocene Conference 1998, Proceedings of MetCon '98, Houston, TX, Jun. 10-11, 1998. 1998: 1-13.
Schick et al, New olefinic interlevel dielectric materials for multichip modules. Multi-Chip Module Conference, 1996. MCMC-96, Proceedings, 1996; IEEE Santa Cruz, CA, Feb. 6-7, 1996; Los Alamitos, CA, IEEE Comput. Soc, US, Feb. 6, 1996, pp. 182-187.
Grove NR et al. Properties and processing of AVATREL™ as a high performance dielectric, Proceedings of 1997 International Conference on Multichip Modules, Denver, CO, Apr. 2-4, 1997; New York, NY, IEEE, Apr. 2, 1997, pp. 224-227.
Wu Q et al. Addition polymerization of norbornene: catalysis of monocyclopentadienyltitanium compounds activated with methylaluminoxane. ACS Symposium Series 760, Transition Metal Catalysts in Macromolecular Design, Eds. Boffa and Novak, 2000, pp. 165-173.
Garrou P et al. Underfill adhesion to BCB (cyclotene™) bumping and redistribution dielectrics. IEEE Transactions on Advanced Packaging. Aug. 2000; 23(3): 568-573.
Seto K. Metalized catalyzed polymerization of cyclic olefins. Ph.D. dissertation, open defense, Jul. 26, 2006.
Natta et al., IT 718796 (Nov. 2, 1966); translation in English.

* cited by examiner

*Primary Examiner* — Rip A. Lee
(74) *Attorney, Agent, or Firm* — Myers Bigel Sibley & Sajovec, P.A.

(57) ABSTRACT

Described is a cyclobutene polymer comprising: monomeric units of cyclobutene, said cyclobutene having at least one fused ring system substituted thereon, said polymer comprising not more than 10 mol percent ring-opened units of said cyclobutene; and said polymer having a molecular weight of at least 1,000; said polymer optionally copolymerized with a comonomer to form a copolymer therewith. Compositions thereof and methods of making the same are also described.

25 Claims, 3 Drawing Sheets

CYCLOBUTENE POLYMERS AND METHODS OF MAKING THE SAME

RELATED APPLICATIONS

This application is a divisional of and claims priority to U.S. patent application Ser. No. 12/438,075, filed Sep. 14, 2010, now issued as U.S. Pat. No. 8,030,424, which application is a national phase application of PCT Application PCT/US2007/018036, filed Aug. 16, 2007, and published in English on Feb. 28, 2008, as International Publication No. WO 2008/024241, and which claims the benefit of United States Provisional Patent Application Ser. No. 60/839,522, filed Aug. 23, 2006, the disclosure of each of which is incorporated by reference herein in its entirety.

FIELD OF THE INVENTION

The present invention concerns polymers and methods of making and using the same.

BACKGROUND OF THE INVENTION

Internal double bonds are notoriously difficult to polymerize in an insertion mode unless they are incorporated as cis bonds in strained rings. While insertion polymerization examples of 3-, 5-, and strained bicyclics (norbornene derivatives) are common, noticeably absent are examples of 4-membered rings. Although cyclobutene has sufficient ring strain, 31 kcal/mol (Schleyer, P. v. R. et al., *J. Am. Chem. Soc.* 1970, 92, (8), 2377), very few examples of vinylic polymerization of cyclobutene are known. This is due to the fact that simple cyclobutenes will undergo rapid pericyclic ring opening reactions to form butadiene or alternatively undergo ROMP. Attempts to polymerize cyclobutene results in a polymer that contain both the cyclobutene repeats and 1,4-butadiene repeat units. These butadiene repeats decrease the thermal stability of the polymer (Dall'asta, G. et al., *Die Makromolekulare Chemie* 1962, 56, (1), 224).

In 1960s, Dall'asta and his co-workers reported several publications of polymerization of cyclobutene, however their polymer contains butadiene units and ring opening polymerization units. Also, the molecular weight information is obscure (See, e.g., Dall'asta, G. *Journal of Polymer Science, Part A; Polymer Chemistry* 1968, 6, 2397; Natta, G. et al., G. *Die Makromolekulare Chemie* 1963, 69-1, 163). They also tried to polymerize a fused ring system, but the resulting polymer has quite low molecular weights and contains ring opened units up to 10 mol % (Dall'asta, G. *Journal of Polymer Science, Part A: Polymer Chemistry* 1968, 6, 2405). To the best of our knowledge, no reports of high molecular weight, genuine vinylic polymer of any cyclobutene derivatives have been published.

In recent years a number of new high performance engineering materials have been prepared through the insertion polymerization of norbornene. These polymers can have outstanding properties, such as low moisture absorption, low dielectric constants, chemical resistance, low birefringence, high breakdown voltages and high glass transition temperatures. A number of those polynorbornene Materials are now commercially available and include Appear® optical polymer material for flat panel display and waveguides, Aprima® adhesives and cover-coat, Avatrel® materials, Duvcor® 193 nm and 157 nm photoresists (Promerus), as well as copolymer of olefins and norbornenes, Topas® (Topas Advanced Polymers) and Apel ® (Mitsui Chemical).

As stated earlier, the insertion polymerization of the 4-membered ring, although highly strained, has been less successful. The unwanted pericyclic ring-opening of cyclobutene to the more stable butadiene has limited advancement in this field.

SUMMARY OF THE INVENTION

The present invention provides a cyclobutene polymer (including copolymers) comprising monomeric units of cyclobutene, the cyclobutene having at least one fused ring system (e.g., a 4-8 carbon fused ring system) substituted thereon, and otherwise substituted or unsubstituted. The polymer may optionally be in the form of a copolymer with one or more suitable comonomers such as norbornene. The polymers may be crosslinkable polymers.

Polymers of the invention can be made by reacting a suitable cyclobutene monomer in an organic solvent with a transition metal catalyst to produce a polymer of the invention.

Polymers of the invention are useful for, among other things, low-k dielectric insulating materials in microelectronic devices.

DETAILED DESCRIPTION OF THE PREFERRED EMBODIMENTS

Figure 1A:
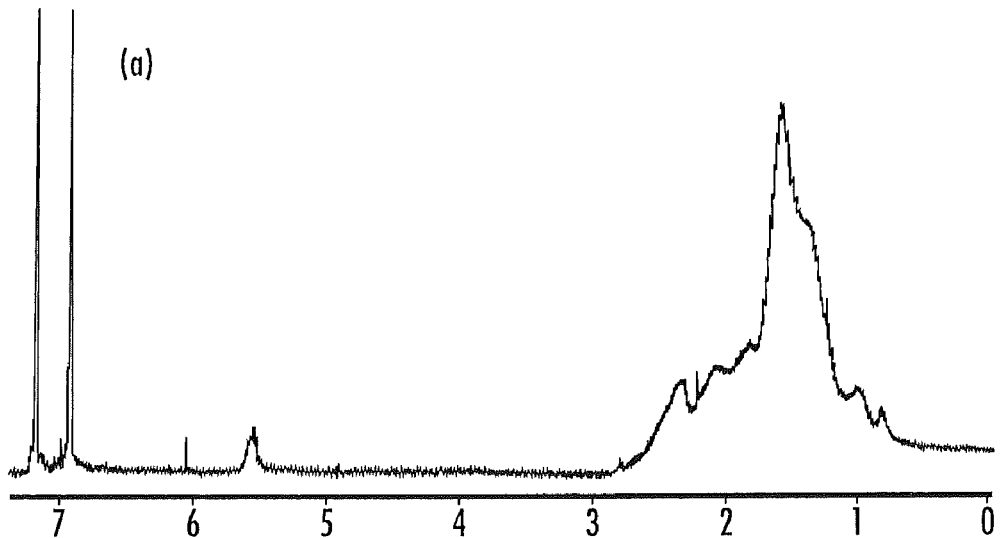
FIG. 1. $^1$H-NMR spectra of polymeric product from monomer 1 (a) catalyzed by VI and (b) catalyzed by VII, in o-DCB-$d_4$ at room temperature.

As noted above, the present invention provides a cyclobutene polymer comprising monomeric units of cyclobutene, the cyclobutene having at least one fused ring system (e.g., a 4-8 carbon fused ring system) substituted thereon.

In some embodiments the polymer preferably comprises not more than 10, 5, 3, 2 or 1 mol percent ring-opened units of the cyclobutene (as ring-opened units can adversely affect $T_g$ and thermal stability of the polymer).

In some embodiments, the polymer is a high molecular weight polymer having a molecular weight of at least 1,000, 10,000, 20,000, or 50,000, up to 1,000,000 or more.

The polymer may optionally be in the form of a copolymer with one or more suitable comonomer such as norbornene. "Copolymer" as used herein includes any type of copolymer, such as random copolymers, block copolymers, taper block copolymers, diblock copolymers terpolymers, and crosslinked materials, etc.

In some embodiments the polymer has a glass transition temperature between 50 and 300° C., while in some more particular embodiments (particularly where the polymer is a copolymer with monomeric unit of norbornene), the polymer has a glass transition temperature between 80 or 200 and 300° C.

The monomeric units of cyclobutene, and/or optionally monomeric units of comonomers such as norbornene, may be substituted with one or more functional groups or unsubstituted (e.g., contain substituents on the fused ring system or systems). In some embodiments it may be more economical to provide one or more functional groups on the comonomers such as a norobornene comonomer than on the cyclobutene monomers. Any suitable functional group, or combination of functional groups, may be utilized, with numerous known to those skilled in the art depending upon the particular use of the polymer. Adhesive groups, polar groups, groups that promoter or inhibit crystallization, groups for crosslinking, groups that raise or lower the glass transition temperature, etc., may all be used as functional groups when desired. In some embodiments, the same functional groups substituted on norbornene in known norbornene polymers may be used. See, e.g., U.S. Pat. Nos. 6,914,328; 6,509,04; 6,492,433; 6,008,873; etc (the disclosures of all United States patent references cited herein are to be incorporated by reference herein in their entirety). Examples of suitable substituents or functional groups include but axe not limited to: epoxy, carboxyl, hydroxyl, ester, silanol, amino, nitrile, halogen, acyl, sulfonic and carboxylic acid anhydride groups; and/or hydroxides, borates, siloxanes, carboxylic acids, thiols, alkyl groups, aryl groups, arylalkyl groups, haloalkyl groups, haloaryl groups, haloarylalkyl groups, etc.

Such functional groups can be, added, to the polymer by using techniques and methods known to those skilled in the art, for example, including them on the monomers prior to polymerization, or by graft reaction of the polymers with a compound such as an unsaturated compound that contains the desired functional group.

The monomeric units of cyclobutene may in some embodiments have Formula I:

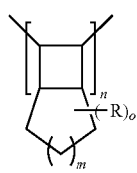

(I)

wherein: each R when present is an independently selected functional group (e.g. as described above); m is 0, 1, 2, 3 or 4; n is an integer corresponding to a molecular weight for said polymer of 1,000 or 50,000 to 1,000,000 or more; and o is an integer from 0 to 2m+4 (or in some embodiments 0 to 5).

Polymers of the invention can be made, for example, by reacting a suitable monomer, optionally with one or more comonomers such as norbornene comonomers, in an organic solvent such as toluene or in bulk monomer with a transition metal catalyst to produce a polymer as described herein. The reaction can be carried out in the presence of an activator such as a methylaluminoxane (MAO) activator, but the amount of the activator may be limited e.g., to from 20 or 50 or 100 to 800 or 1000 equivalents thereof, to enhance the reaction and facilitate the formation, of higher molecular weight polymers. The reaction may be carried out at any suitable time and temperature, as would be known and practiced by those skilled in the art. Suitable cyclobutene monomers include, but are not limited to, compounds of Formula i:

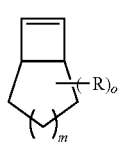

(i)

wherein each R (when present) is an independently selected functional group; m is 0, 1, 2, 3 or 4; and o is an integer from 0 to 2m+4 (or in some embodiments 0 or 1 to 4 or 5).

A preferred titanium complex catalyst is a compound of Formula VIII

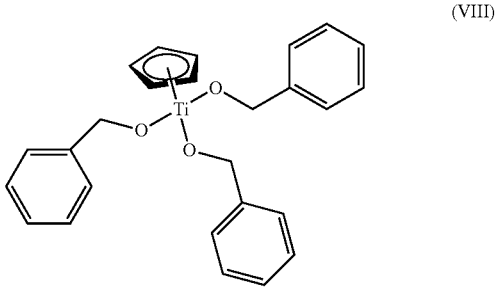

(VIII)

Other reaction conditions will be apparent to those skilled in the art based upon the instant disclosure.

Utility

Polymers of the invention can be used to form shaped articles that comprise, consist of or consist essentially of the polymers of the invention, examples of which include but are not limited to flat panel displays, waveguides, insulators, etc.

Polymers of the invention can be used to form adhesive compositions that comprise, consist of or consist essentially of polymers of the invention.

Polymers of the invention can be used to form crosslinked compositions that comprise; consist of or consist essentially of polymers of the invention.

Polymers of the invention can be used to form photoresist compositions that comprise, consist of or consist essentially of polymers of the invention.

Polymers of the invention can be used to form low-k dielectric insulator materials that comprise, consist of or consist essentially of a polymer of the invention.

Polymers of the invention can be used to form microelectronic devices (e.g., circuits) comprising a low-k dielectric insulator material, optionally associated with one or more semiconductor and/or conductors, with the insulator material comprising, consisting of or consisting essentially of a polymer of the invention.

EXAMPLES 1-7

Previous attempts to polymerize cyclobutenes compounds have led to materials with unsaturated units. This unsaturation results from a pericyclic ring-opening of the four membered ring to a butadiene derivative that then can be copolymerized. Our approach to eliminating the pericyclic ring opening reaction has been to tie the 3,4-carbons of the butadiene together through an additional fused ring. This "cis" fused ring prevents the facile pericyclic ring opening from occurring because it forces a trans double bond into the cyclic structure. Bicyclo[4.2.0]oct-7-ene (1) and bicyclo[3.2.0]hept-6-ene (2) are two examples of these fused systems. The synthesis of monomer 1 and 2 is summarized in Scheme 1. All the steps are quite straightforward and proceed in reasonable yields.

Scheme 1. Synthesis of monomers 1 and 2 from 1,5-cyclooctadiene and 1,3-cycloheptadiene, respectively

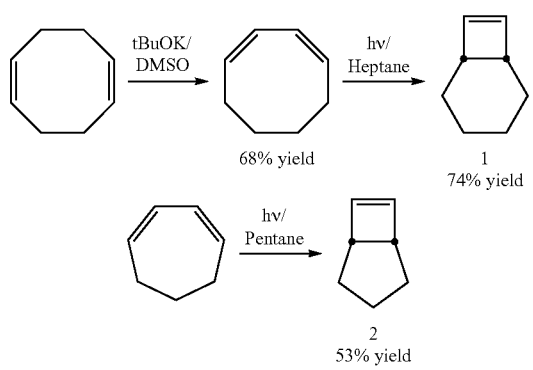

Since monomers 1 and 2 have fused ring systems similar to norbornene, it was assumed that β-hydride elimination would not be a significant process during polymerization because of Bredt's rule. Late transition metal catalysts are prone to β-hydride eliminate unless bulky ligands are used, such as those in the Brookhart type nickel or palladium catalysts. For monomers like norbornene that do not have the intrinsic ability to β-hydride eliminate, simple nickel or palladium complexes can be very active catalyst systems (Arndt, M.; Gosmann, M. *Polymer Bulletin* 1998, 41, 433).[6] Among the late transition metal catalyst systems, nickel(acetylacetonate) or its derivative with tris(pentafluorophenyl)borane system is simple yet shows high activity toward norbornene polymerization (See, e.g., Barnes, D. A. et al.; *Macromolecules* 2003, 36, 2623; Lassahn, F.-G. et al.; *Zeitschrift fuer Naturforschung, B: Chemical Sciences* 2001, 56b, (12), 1289). Another simple nickel catalyst system active for norbornene polymerization is [1,2-bis(diphenylphosphino)ethane]dichloronickel with methylaluminoxane (MAO). This catalyst system first reported for ethylene polymerization in 1993 (Busby, R. et al.; C. *J. Chem. Soc. Dalton Trans.* 1993, 3767), and Janiak and his co-workers recently reported that this system shows good polymerization activity toward norbornene (Janiak, C. et al. V. *Macromol. Symp.* 2006, 236, 88). While these simple nickel complexes work very well toward the polymerization of norbornene, nickel or palladium complexes with well designed bulky ligand such as Grubbs type, salicylaldiminate neutral nickel catalyst system (Younkin, T. R. et al. Science (Washington, D.C.) 2000, 287, (5452), 460-46) or Brookhart type, α-diimine palladium cationic catalyst system are also reported to be active toward norbornene/functionalized norbornene and ethylene co-polymerization (Kiesewetter, J. et al; *Polymer* 2006, 47, 3302; Kiesewetter, J.; Kaminsky, W. *Chem. Eur. J.* 2003, 9, (8), 1750).

In contrast, early transition metal catalysts based on, titanium or zirconium, are known to have less of a tendency to β-hydride eliminate. However, titanium complexes, based on biscyclopentadienyl titanium for instance, are known to catalyze ring opening metathesis polymerization of norbornene as well (Tritto, I. et al., P. *Journal of Molecular Catalysis A: Chemical* '1998, 133, 139; Qian, Y. et al., *Journal of Molecular Catalysis A: Chemical* 1998, 133, 135). In contrast, activated biscyclopentadienyl zirconium complexes exclusively catalyze addition polymerization of norbornene (See, e.g., McKnight, A. L.; Waymouth, R. M. *Macromolecules* 1999, 32, 2816). Because of steric repulsion, biscyclopentadienyl zirconium species do not show high catalytic activity toward norbornene and a more open form of zirconocene or titanocene would be better suited for strained cyclic olefin such as norbornene. The catalysts used for this study are shown in Chart 1.

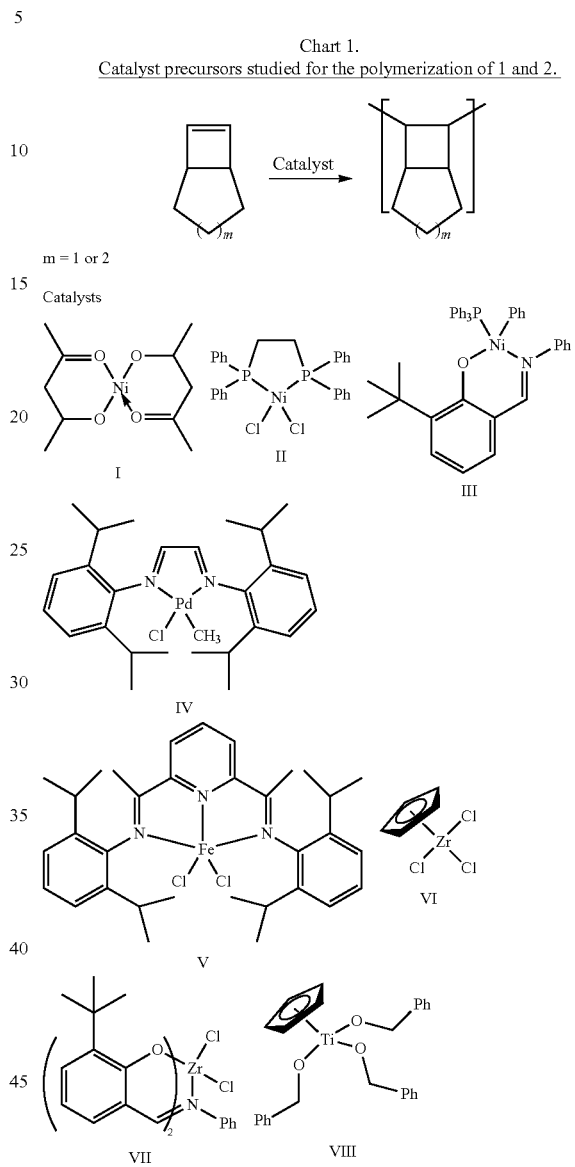

Chart 1. Catalyst precursors studied for the polymerization of 1 and 2.

Surprisingly, none of the late transition metal catalyst systems that were tried and are active toward norbornene showed activity toward monomer 1. Only VI/MAO, VII/MAO, and VIII/MAO showed activity. Since the polymeric product from polymerization of 1 catalyzed by VI is soluble in 1,2-dichlorobenzene and partially soluble in toluene and chloroform, we studied its structure by NMR and found signals for olefinic protons. Gel permeation chromatography showed a trimodal polymer distribution of relatively low molecular weight.

Figure 1B:
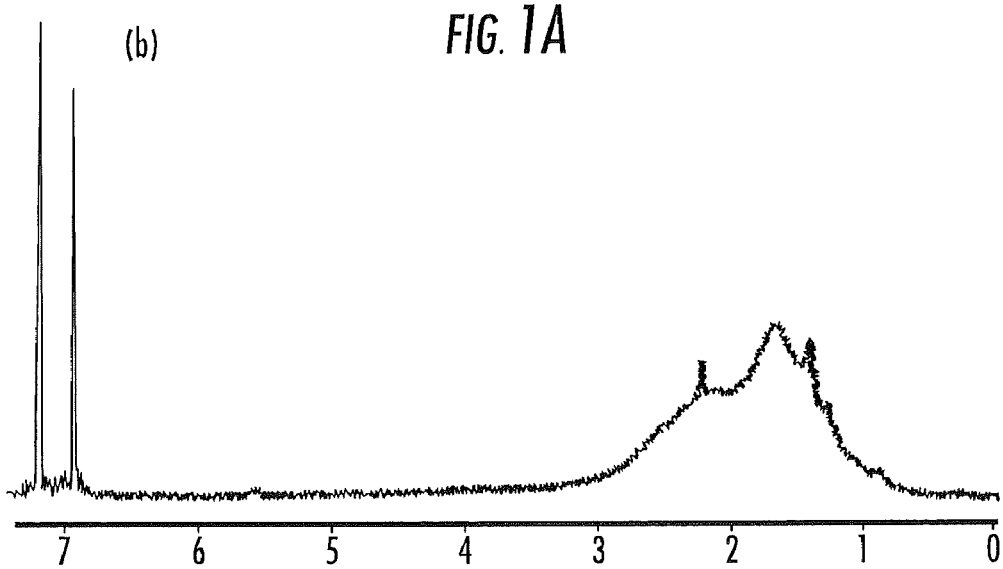

A polymerization attempt of monomer 1 in toluene with zirconium complex VII activated by 3,400 eq of MAO afforded a low molecular weight polymeric product ($M_w$=3,300) with a moderate yield of 64%. Monomer 2 was also polymerized under same conditions and gave 74% yield. Poly-2 was found to be insoluble in all solvents even at high temperature. The $^1$H-NMR spectra of the poly-1 obtained using VI and VII are shown in FIG. 1. A diminished olefin peak is clearly seen in the material obtained using catalyst VII:

Bulky monomers do not always compete well with ethylene, but it was also discovered that monomer 1 will copolymerize with ethylene. The copolymerization of monomer 1 with ethylene was successful using catalyst VII. Poly(1-co-E) is not soluble at room temperature, so we performed high temperature $^{13}$C-NMR of the homopolymer and copolymer. The differences between the two spectra clearly indicate formation of a random copolymer, and does not indicate a mixture of two homopolymers or block copolymers. Monomer incorporation ratio is calculated ethylene/1=5/1 based on quantitative $^{13}$C-NMR. GPC analysis again showed relatively low molecular weight material ($M_w$=8,200) and no Tg could be detected between −35° C. and 380° C.

By investigating the source of the olefin peak in the NMR samples, it was concluded that olefin formation occurs through β-hydride elimination. Control experiments show that 1,3-cyclooctadiene, which would result from pericyclic ring-opening does not polymerize with VII, and the ROMP polymer (made using Grubbs' ruthenium catalyst with 1) displays a very different NMR spectrum. Although β-hydride elimination from a poly-1 chain is unlikely because of the formation of a bridgehead olefin (Bredt's rule), in this case the bridgehead olefin, bicyclo[4.2.0]oct-8-ene, is known, and can be isolated (Salomon, R. G. et al., M. F. *J. Am. Chem. Soc.* 1978, 100, (2), 520). To help confirm the bridgehead olefin structure at the terminal repeat unit, 2D-NMR experiments were employed. $^1$H-$^{13}$C short range (one bond correlation) and long range (two bonds correlation) 2D-NMR spectra of polymeric sample from monomer 1 polymerization using VI clearly show the correlations between the olefinic proton and corresponding carbons, which appear 132 ppm and 44 ppm, respectively. These two carbon peaks are well matched with predicted values of 7 and 8 position of bicyclo[4.2.0]oct-8-ene unit.

MAO, its purity and concentration are known to influence many factors including molecular weight by chain transfer to aluminum. A number of solutions to this have been put forward and include trimethylaluminum free ('dried') MAO, modified MAOs produced or reported by Akzo Nobel and Sumitomo Chemical, and the use of borane or other additives (Fujita, M. et al. *Macromol. Chem. Phys.* 2004, 205, 884; Ioku, A. et al., *Macromol. Chem. Phys.* 2002, 203, 748; Saito, J. et al., *Macromolecular Chemistry and Physics* 2002, 203, (1), 59-65).

Taking all these possible solutions under consideration, we conducted activator modification experiments in attempt to produce high molecular weight poly-1. All VII and activator combinations produced polymers, and all the materials obtained were not soluble in 1,2-dichlorobenzene at room temperature, so high temperature GPC was performed. These results clearly show that reducing the amount of MAO down to 500 eq produced high molecular weight poly-1 with excellent productivity. Polydispersities lower than 2.0 indicate single active species. Water and pentafluorophenyl modified MAO showed a little improvement on yield, but not in molecular weight. "Dried" MAO also produced much higher molecular weight poly-1 with good productivity. Finally, the modified MAO also showed high productivity.

Thermogravimetric analysis revealed that both poly-1 and poly-2 have thermal stabilities close to 400° C. even with very low molecular weights. Differential scanning calorimetric analysis of samples with both low and high molecular weights (poly-1, the molecular weights of poly-2 samples are unknown due to insolubility) showed both polymers have almost the same glass transition temperature near 80° C. regardless of molecular weight. Since we expected our polymers to possess similar thermal behavior as polynorbornenes do, this was quite a surprising result to us.

Glass transition temperature depends on the microstructure of polymer, the rigidity of polymer main chain, steric bulk of side chain, and stereoregularity. High glass transition temperatures of polynorbornene, >340° C., is understood to arise from its tightly connected bulky repeat unit and relatively regular microstructure, which results in tightly packed polymer chains (low free volume). The low glass transition temperature of poly-1 could be due in part to a less tightly packed structure of polymer (higher free volume).

Figure 2:
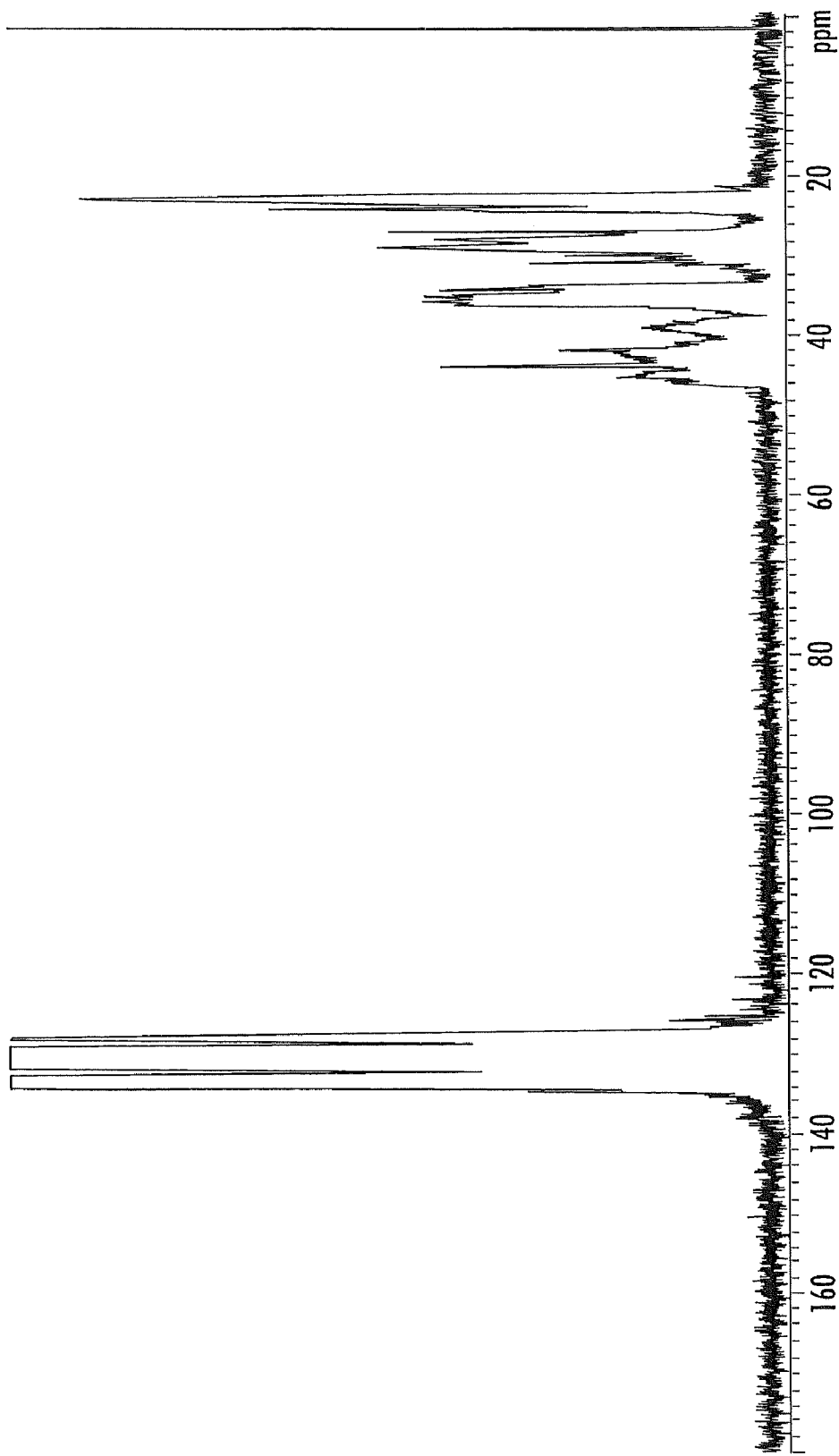
FIG. 2. 13C-NMR spectrum of poly-1, in o-DCB at 130° C.
Figure 3:
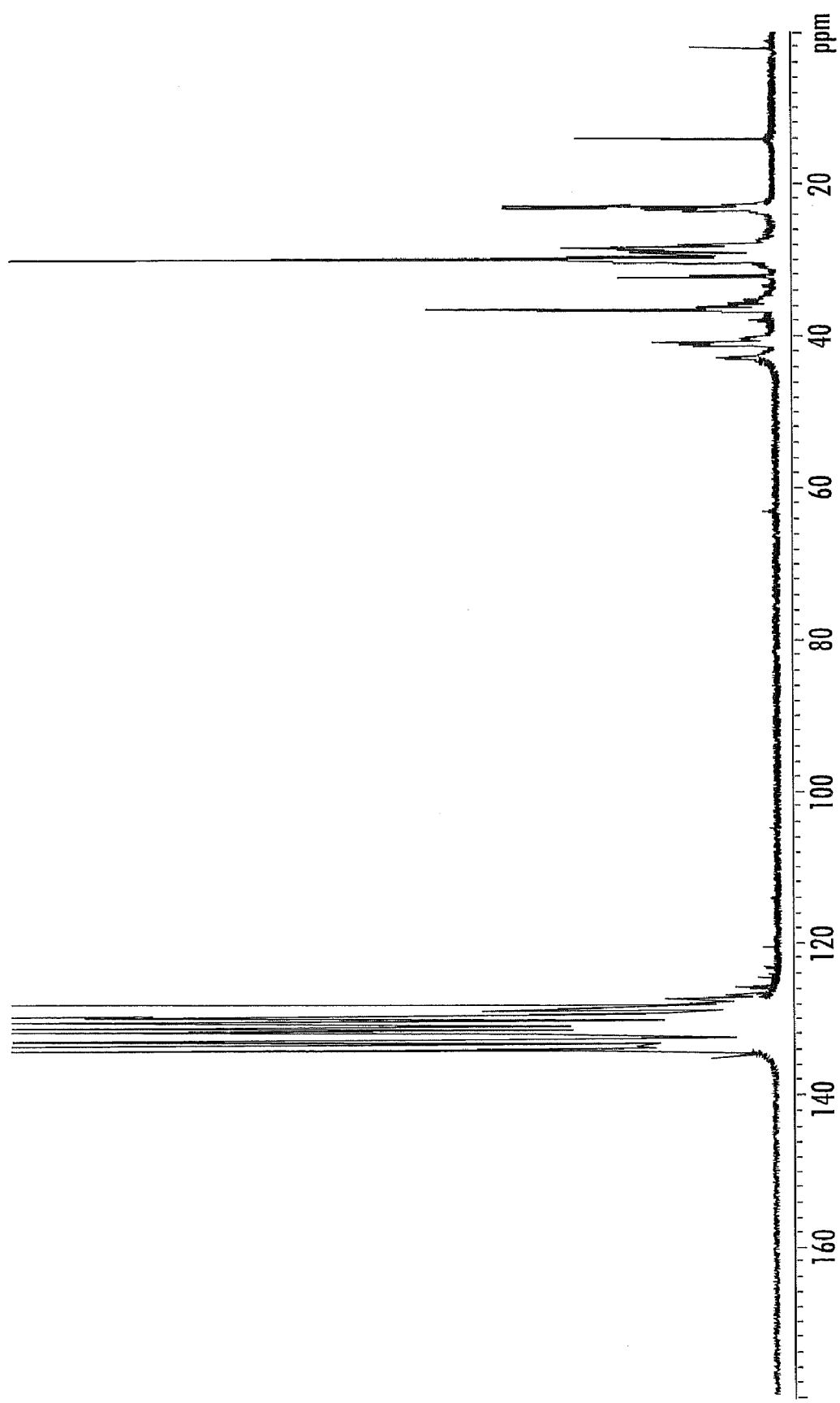
FIG. 3. $^{13}$C-NMR spectrum of poly(1-co-E) in o-DCB at 130° C.

$^{13}$C-NMR spectra of homopolymer (poly-1) are given as FIG. 2 and copolymer (poly(1-co-E)) are given as FIG. 3.

Experimental Section

General Procedures and Characterization. 1,5-Cyclooctadiene, potassium tert-butoxide, acetophenone, 1,3-cycloheptadiene, 1,2-bis(phenylphosphino)-ethane, 3-tertbutylsalicylaldehyde, aniline, glyoxal, 2,6-diisopropylaniline, 2,6-diacetylpyridine, n-butyllithium, methylaluminoxane (MAO), tiisobutylaluminum and were purchased from Aldrich Chemical Inc. and used as received. Pentafluorophenol was purchased from Tokyo Kasei Ltd. Nickel(II) chloride hexahydrate, (COD)PdCl$_2$, iron(II) chloride tetrahydrate, zirconium(IV) chloride tetrahydrofranate, nickel(II) acetylacetonato, bis(cyclooctadiene) nickel and zirconium monocyclopentadiene trichloride were purchased from Strem Chemicals Inc. and used as received except for nickel(II) acetylacetonato, which was recrystallized from benzene solution. Tris(pentafluorophenyl)borane and triphenylmethyl tetrakis(pentafluorophenyl)borate were provided from Albemarle Corp. Water was purified through reverse osmosis filter.

Toluene, hexane, benzene, dichloromethane, and diethylether were purchased from Aldrich Chemical Inc. as anhydrous grade and used passing through Mbraun dry solvent system. Other solvents were purchased from Aldrich Chemical Inc. or Fisher Scientific with or without standard purification as needed. In the case of handling the air/moisture sensitive materials, Mbraun Unilab Dry-Box system or standard Schlenk techniques were used as needed.

$^1$H-NMR spectra were obtained using a Varian Mercury 400 (400 MHz), Varian Mercury 300 (300 MHz) spectrometers, or Bruker AVANCE 500 (500 MHz) as specified. Chemical shifts are reported in δ (ppm) and are referenced to selected residual proton peaks for the solvents or to internal standard. Significant $^1$H NMR data are tabulated in the following order: chemical shift, multiplicity (s=singlet, d=doublet, t=triplet, q=quartet, m=multiplet, br: broad), coupling constant in Hertz, number of protons.

The gel permeation chromatography was performed using 2 PL gel Mixed B columns and evaporative light scattering detector (ELSD) in trichlorobenzene at 160° C. All samples were prepared at approximate concentrations of 2 mg/mL in HPLC grade 1,2,4-Trichlorobenzene (TCB). The samples were shaken at 160° C. to dissolve the polymer sample. All samples appeared to be soluble after overnight shaking. All samples were filtered through a 2 μm stainless steel frit filter. Polystyrene standard was used for reference.

Differential scanning calorimetry and thermogravimetric analysis were performed using TA instrument systems model DSC 2920 and Hi-Res TGA 2950.

Procedures

Monomer synthesis: 1,3-Cyclooctadiene was prepared from 1,5-cyclooctadiene according to literature procedures (Evaprabhakara, D. et al., *J. Am. Chem. Soc.* 1963, 85, 1553).

Bicyclo[4.2.0]oct-7-ene, 1 was prepared according to literature procedures (Liu, R. S. H. *J. Am. Chem. Soc.* 1967, 89, 112).

Bicyclo[3.2.0]hept-6-ene, 2 was prepared according to literature procedures (Inoue, Y. et al., *J. Chem. Soc., Chem. Commun.*, 1985, 1307).

Activator (Dried MAO) Synthesis: Dried MAO was prepared according to literature procedures (Shiono, T. et al, *Macromolecules* 2001, 34, 3142.

Catalyst synthesis: [1,2-bis(diphenylphosphino)ethane] dichloronickel(II) was prepared according to literature procedures (Busby, R. et al., *J. Chem. Soc. Dalton Trans.* 1993, 3767).

[N-(3-tert-butylsalicylidene)-anilinato]-phenyl-triphenylphosphine nickel(II) was synthesized using a modified procedure from the literature (Matsui, S. et al., *J. Am. Chem. Soc.* 2001, 123, (28), 6847-6856; Matsui, S. et al., *J. Am. Chem., Soc.* 2001, 123, (28), 6847-6856).

[(ArN=C(H)—C(H)=NAr)]Pd(CH$_3$)Cl was prepared according to literature Procedures (Johnson, L. K. et al., *J. Am. Chem. Soc.* 1995, 117, (23), 6414-15).

2,6-bis-[1-(2,6-dimethylphenylimino)ethyl]pyridine iron (II)chloride was prepared according to literature procedures (Small, B. L. et al., *J. Am. Chem. Soc.* 1998, 120, (16); 4049-4050).

Bis[N-(3-tert-butylsalicylidene)anilinato]zirconium(IV) dichloride was prepared according to literature procedures (Matsui, S. et al., *J. Am. Chem. Soc,* 2001, 123, (28), 6847-6856).

Polymerization procedures: All manipulations are under nitrogen using standard Schlenk techniques or a dry-box.

Run 1: Bis[N-(3-tert-butylsalicylidene)anilinato]zirconium(IV) dichloride (1 mL of 10.0 µmol/mL solution in toluene) was placed in Schlenk flask, then MAO 1.7 M solution in toluene of 20 mL was added at room temperature. 1.0 g (9.24 mmol) of monomer 1 was added to this solution. After 24 hours of stirring at room temperature, the resulting hazy solution was poured into acidic methanol. The polymeric product was then washed, filtered and dried under vacuum. 0.64 g of poly-1 was obtained as white powder. (64% yield) High temperature (130° C.) GPC analysis: Mw=3,300, Mn=1,100

Run 2: MAO 1.7 M solution in toluene of 3 mL was placed in Schlenk flask, and then bis[N-(3-tert-butylsalicylidene) anilinato]zirconium (IV) dichloride (1 mL of 10.0 µmol/mL solution in toluene) was then added at room temperature. 1.0 g (9.24 mmol) of monomer 1 was added to this solution. After 18 hours of stirring at room temperature, the hazy solution was poured into acidic methanol. The polymeric product was then washed, filtered and dried under vacuum. 0.97 g of poly-1 was obtained as white powder. (97% yield) High temperature (130° C.) GPC analysis: Mw=219,000, Mn=141,000

Run 3: (Ioku, A. et al., *Macromol. Chem. Phys.* 2002, 203, 748): MAO 1.7 M solution in toluene of 3 mL was placed in Schlenk flask, then solvent and volatile trimethylalminum were removed by 4 hours of vacuum. 3 mL of toluene was added to dissolve "dried" MAO, and bis[N-(3-tert-butylsalicylidene)anilinato]zirconium(IV) dichloride (1 mL of 10.0 µmol/mL solution in toluene) was then added at room temperature. Monomer 1 (1.0 g, 9.24 mmol) solution in 6 mL of toluene was added to this solution. After 18 hours of stirring at room temperature, the hazy solution was poured into acidic methanol. The polymeric product was then washed, filtered and dried under vacuum. 0.83 g of poly-1 was obtained as white powder. (83% yield)

High temperature (130° C.) GPC analysis Mw=164,000, Mn=99,000 Run 4 (Fujita, M. et al., *Macromol. Chem. Phys.* 2004, 205, 884): MAO 1.7 M solution in toluene of 3 mL was placed in Schlenk flask, then 18 µL of water was added to MAO solution and kept stirring for 10 minutes at room temperature. 0.84 g of pentafluorophenol in 3 mL of toluene was added and stirred for another 10 minutes. Bis[N-(3-tert-butylsalicylidene)anilinato]zirconium(IV) dichloride (1 mL of 10.0 µmol/mL solution in toluene) was then added to this solution followed by monomer 1 (1.0 g, 9.24 mmol) solution in 3 mL of toluene was added to this solution. After 20 hours of stirring at room temperature, the hazy solution was poured into acidic methanol. The polymeric product was then washed, filtered and dried under vacuum. 0.9 g of poly-1 was obtained as white powder. (90% yield) High temperature (130° C.) GPC analysis: Mw=7,400, Mn=2,100

Run 5: (Saito, J. et al., *Macromol. Chem. Phys.* 2002, 203, (1), 59-65): Triisobutylaluminum solution in toluene (1.0 M) of 1 mL was placed in schlenk flask. 3 mL of toluene was added to this solution followed by bis[N-(3-tert-butylsalicylidene)anilinato]zirconium(IV) dichloride (1 mL of 10.0 µmol/mL solution in toluene). After 10 minutes of stirring at room temperature, 18.5 mg of triphenylmethyl tetrakis(pentafluorophenyl)borate in 2 mL of toluene was added, then monomer 1 (1.0 g, 9.24 mmol) solution in 3 mL of toluene was added. After 20 hours of stirring at room temperature, the hazy solution was poured into acidic methanol. The polymeric product was then washed, filtered and dried under vacuum. 0.14 g of poly-1 was obtained as white powder. (14% yield) High temperature (130° C.) GPC analysis: Mw=2,400, Mn=700

Run 6: (Ioku, A. et al., *Macromol, Chem. Phys.* 2002, 203, 748): 0.42 mL of trioctylaluminum hexane solution (0.48M) was placed in schlenk flask and hexane was removed under vacuum. After an addition of 4 mL of toluene, bis[N-(3-tert-butylsalicylidene)anilinato]zirconium(IV) dichloride (1 mL of 10.0 µmol/mL solution in toluene) was added. 5.12 mg of tris(pentafluorophenyl)borane in 3 mL of toluene was added, followed by addition of monomer 1 (1.0 g, 9.24 mmol) solution in 3 mL of toluene. After 18 hours of stirring at room temperature, the hazy solution was poured into acidic methanol. Only a trace amount, of polymeric material was obtained.

Run 7: At room temperature, 1.5 mL of triisobutylaluminum solution in toluene (1.0 M) and 27 µL of water were reacted in Schlenk flask with 2 mL of toluene. To this flask, 2.1 mL of MAO toluene solution (1.7M) was added. Toluene solution of bis[N-(3-tert-butylsalicylidene)anilinato]zirconium(IV) dichloride (1 mL of 10.0 µmol/mL solution in toluene) was added, then monomer 1 (1.0 g, 9.24 mmol) in 3.5 mL of toluene was added. After 22 hours of stirring at room temperature, the hazy solution was poured into acidic methanol. The polymeric product was then washed, filtered and dried under vacuum. 0.86 g of poly-1 was obtained as white powder. (86% yield) High temperature (130° C.) GPC analysis: Mw=245,000, Mn=155,000

Polymerization of monomer 2 was performed using the same procedures as used for monomer 1.

EXAMPLES 8-9

A catalyst system useful in carrying out the present invention is (CpTi(OBn)$_3$/MAO) (Wu, Qing; Lu, Yingying; Lu, Zejian, "Addition Polymerization of Norbornene: Catalysis of Monocyclopentadienyltitanium Compounds Activated with Methylaluminoxane", in *Transition Metal Catalysis in Macromolecular Design*, Boffa, L. S.; Novak, B. M. ACS Symposium Series 760, American Chemical Society, 2000, Chapter 10) that appears to work well and provide nearly quantitative yields of NB/CB copolymers with Tg values near 220° C.

EXAMPLE 8

(80/20 NB/CB)

In a 25 mL Schlenk flask, 0.75 g of norbornene (NB) (8.0 mmol) and 0.22 g of bicyclo[4.2.0]oct-7-ene (CB) (2.0 mmol) were placed with 2 mL of toluene. Then this flask was on an oil bath at 60 to 65° C. A solution of dried MAO in toluene, 0.6 mmol (0.6 mL of 1.0 mmol/mL) and a solution of CpTi(OBn)$_3$ in toluene, 10 µmmol (0.2 mL of 50 µmol/mL) were then added to this monomer solution. The reaction mixture turned orange immediately after addition of the catalyst and became viscous in 5 minutes. After 24 hours of stirring at 60 to 65° C., the reaction mixture was poured into an excess amount of acidic methanol. Vacuum filtration and drying under reduced pressure gave 0.94 g of a white polymer material (97% yield). This polymer was soluble in toluene at room temperature. Tg=220° C. (DSC, 5° C./min, −30 to 350° C.). GPC $M_n$=35,000 $M_w/M_n$=2.3 (relative to polystyrene). No olefin peaks could be detected by $^1$H NMR.

EXAMPLE 9

(95/5 NB/CB)

In a 25 mL Schlenk flask, 0.89 g of norbornene (9.5 mmol) and 0.05 g of bicyclo[4.2.0]oct-7-ene (0.5 mmol) were placed with 2 mL of toluene. Then this flask was on an oil bath at 60 to 65° C. A solution of dried MAO in toluene, 0.6 mmol (0.6 mL of 1.0 mmol/mL) and a solution of CpTi(OBn)$_3$ in toluene, 10 mol (0.2 mL of 50 µmol/mL) were then added to this monomer solution. The reaction mixture turned orange immediately after addition of the catalyst and became highly viscous in less than 5 minutes. After 24 hours of stirring at 60 to 65° C., the reaction mixture was poured into an excess amount of acidic methanol. Vacuum filtration and drying under reduced pressure gave 0.93 g of a white polymer material (99% yield). This polymer was insoluble in toluene at room temperature but soluble at higher temperature at around 60° C. No Tg could be detected using DSC (5° C./min, −30 to 350° C.).

The foregoing is illustrative of the present invention, and is not to be construed as limiting thereof. The invention is defined by the following claims, with equivalents of the claims to be included therein.

That which is claimed is:

1. A shaped article comprising a polymer, wherein said article is a flat panel display, a waveguide, or an insulator; wherein said polymer is a cyclobutene polymer comprising monomeric units of cyclobutene, said cyclobutene having at least one fused ring system substituted thereon, said polymer comprising not more than 10 mole percent ring-opened units of said cyclobutene; and said polymer having a molecular weight $M_W$ of at least 1,000; and wherein said polymer is a copolymer with monomeric units of norbornene, and wherein said polymer has a glass transition temperature between 80 and 300° C.

2. An adhesive composition comprising a cyclobutene polymer comprising monomeric units of cyclobutene, said cyclobutene having at least one fused ring system substituted thereon, said polymer comprising not more than 10 mole percent ring-opened units of said cyclobutene; and said polymer having a molecular weight $M_W$ of at least 1,000; and wherein said polymer is a copolymer with monomeric units of norbornene, and wherein said polymer has a glass transition temperature between 80 and 300° C.

3. A photoresist composition comprising a cyclobutene polymer comprising monomeric units of cyclobutene, said cyclobutene having at least one fused ring system substituted thereon, said polymer comprising not more than 10 mole percent ring-opened units of said cyclobutene; and said polymer having a molecular weight $M_W$ of at least 1,000; and wherein said polymer is a copolymer with monomeric units of norbornene, and wherein said polymer has a glass transition temperature between 80 and 300° C.

4. A low-k dielectric insulator material comprising a cyclobutene polymer comprising monomeric units of cyclobutene, said cyclobutene having at least one fused ring system substituted thereon, said polymer comprising not more than 10 mole percent ring-opened units of said cyclobutene; and said polymer having a molecular weight $M_W$ of at least 1,000; and wherein said polymer is a copolymer with monomeric units of norbornene, and wherein said polymer has a glass transition temperature between 80 and 300° C.

5. A microelectronic device comprising a low-k dielectric insulator material, said insulator material comprising a cyclobutene polymer comprising monomeric units of cyclobutene, said cyclobutene having at least one fused ring system substituted thereon, said polymer comprising not more than 10 mole percent ring-opened units of said cyclobutene; and said polymer having a molecular weight $M_W$ of at least 1,000; and wherein said polymer is a copolymer with monomeric units of norbornene, and wherein said polymer has a glass transition temperature between 80 and 300° C.

6. The article of claim 1, said polymer having a molecular weight $M_W$ of 1,000 to 1,000,000, and comprising not more than 5 mole percent ring-opened units of said cyclobutene.

7. The composition of claim 2, said polymer having a molecular weight $M_W$ of 1,000 to 1,000,000, and comprising not more than 5 mole percent ring-opened units of said cyclobutene.

8. The composition of claim 3, said polymer having a molecular weight $M_W$ of 1,000 to 1,000,000, and comprising not more than 5 mole percent ring-opened units of said cyclobutene.

9. The material of claim 4, said polymer having a molecular weight $M_W$ of 1,000 to 1,000,000, and comprising not more than 5 mole percent ring-opened units of said cyclobutene.

10. The device of claim 5, said polymer having a molecular weight Mw of 1,000 to 1,000,000, and comprising not more than 5 mole percent ring-opened units of said cyclobutene.

11. The article of claim 1, wherein said polymer has a glass transition temperature between 200 and 300° C.

12. The composition of claim 2, wherein said polymer has a glass transition temperature between 200 and 300° C.

13. The composition of claim 3, wherein said polymer has a glass transition temperature between 200 and 300° C.

14. The material of claim 4, wherein said polymer has a glass transition temperature between 200 and 300° C.

15. The device of claim 5, wherein said polymer has a glass transition temperature between 200 and 300° C.

16. The article of claim 1, wherein said norbornene is substituted with an adhesive group.

17. The composition of claim 2, wherein said norbornene is substituted with an adhesive group.

18. The composition of claim 3, wherein said norbornene is substituted with an adhesive group.

19. The material of claim 4, wherein said norbornene is substituted with an adhesive group.

20. The device of claim 5, wherein said norbornene is substituted with an adhesive group.

21. The article of claim 1, wherein said polymer is a crosslinkable polymer.

22. The composition of claim 2, wherein said polymer is a crosslinkable polymer.

23. The composition of claim 3, wherein said polymer is a crosslinkable polymer.

24. The material of claim 4, wherein said polymer is a crosslinkable polymer.

25. The composition of claim 5, wherein said polymer is a crosslinkable polymer.

* * * * *

UNITED STATES PATENT AND TRADEMARK OFFICE
CERTIFICATE OF CORRECTION

PATENT NO. : 8,404,792 B2
APPLICATION NO. : 13/221302
DATED : March 26, 2013
INVENTOR(S) : Novak et al.

Page 1 of 1

It is certified that error appears in the above-identified patent and that said Letters Patent is hereby corrected as shown below:

On Title Page:
Item [73] Assignee: delete "North Carolina Sate University"
insert -- North Carolina State University --

In the Specification:
Column 3, Line 9: delete "6,509,04;"
insert -- 6,509,134; --

Column 11, Line 14: delete "10 ummol (0.2 mL"
insert -- 10 µmol (0.2 mL --

Column 11, Line 35: delete "10 mol (0.2 mL"
insert -- 10 µmol (0.2 mL --

Signed and Sealed this
Twenty-ninth Day of April, 2014

Michelle K. Lee
*Deputy Director of the United States Patent and Trademark Office*